No. 702,623. Patented June 17, 1902.
J. BRUNNER & H. J. ROOT.
FURNITURE COUPLING.
(Application filed Mar. 13, 1902.)
(No Model.)
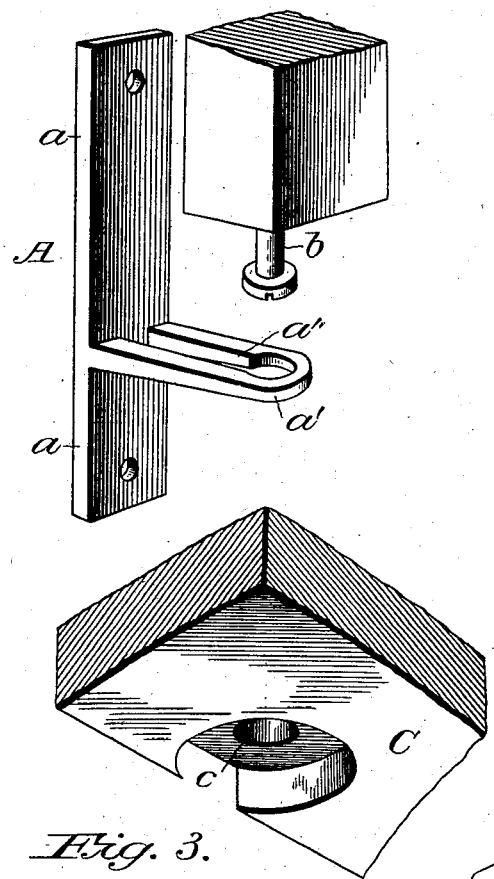
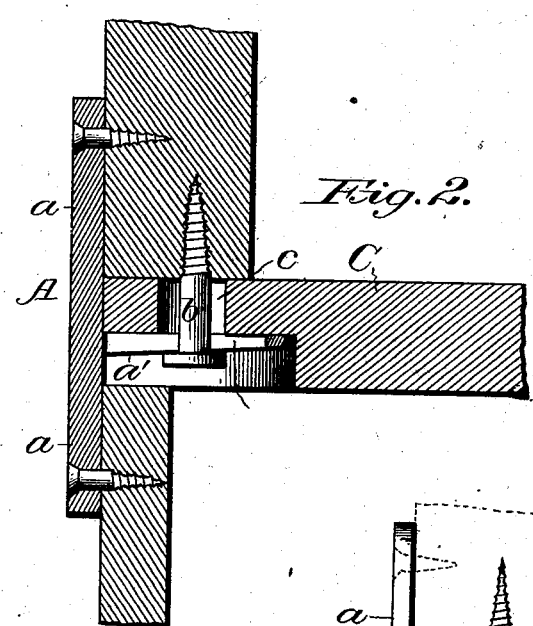
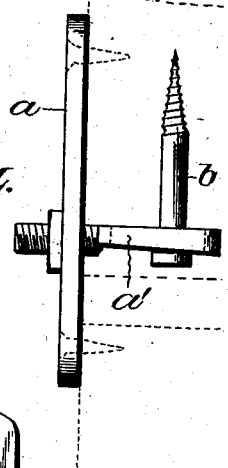
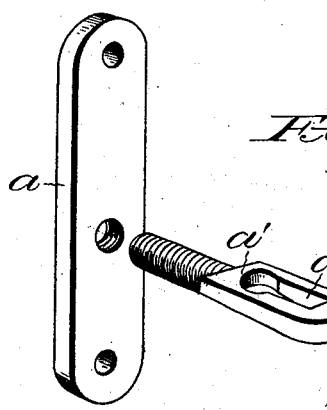
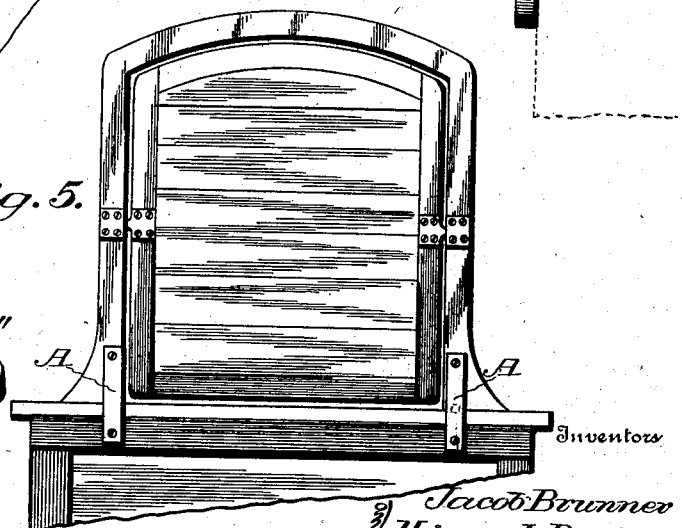
Witnesses
Inventors
Jacob Brunner
Hiram J. Root
By
Attorney

UNITED STATES PATENT OFFICE.

JACOB BRUNNER AND HIRAM J. ROOT, OF SHELBYVILLE, INDIANA.

FURNITURE-COUPLING.

SPECIFICATION forming part of Letters Patent No. 702,623, dated June 17, 1902.

Application filed March 13, 1902. Serial No. 98,017. (No model.)

*To all whom it may concern:*

Be it known that we, JACOB BRUNNER and HIRAM J. ROOT, citizens of the United States, residing at Shelbyville, in the county of Shelby and State of Indiana, have invented new and useful Improvements in Furniture-Couplings, of which the following is a specification.

This invention relates to certain new and useful improvements in couplings for furniture, the object being to provide a simple, cheap, and effective means for connecting contiguous parts of furniture and at the same time furnish a brace which will overlie the joint of the connected parts, as will be hereinafter set forth.

The invention consists of a combined coupling and brace consisting of a brace-bar, a slotted wedge, and a screw-bolt for connecting to one part of an article of furniture the part from which the screw-bolt projects, as will be hereinafter described, and pointed out in the claims.

In the accompanying drawings, which illustrate the invention, Figure 1 is a perspective view showing one form of coupling and brace and two parts to be connected thereby. Fig. 2 is a sectional view of the parts connected. Fig. 3 is a perspective view of a modified form of the coupling and brace. Fig. 4 is a side elevation of a further modification; and Fig. 5 is a rear elevation of a bureau, the pillars or mirror-supporting frame being connected to the base by the couplings and braces.

The brace-bars and couplings, as shown in Figs. 1 and 2, are preferably integral, said one piece A comprising a bar $a$, with apertures near the ends, and a wedge $a'$, which is oblique on one side and flat on the other side, the upper face or flat side of the wedge projecting at right angles with the inner face of the bar. The wedge $a'$ has therethrough a keyhole-slot $a''$, the rounded or enlarged part of the slot being through the thinner part of the wedge.

As a modification of the invention the bar or brace $a$ may be separate from the wedge and provided with an aperture $a^3$ of such a size as to admit of the shank on the wedge being passed through the aperture. The aperture may be slightly larger than the shank of the wedge when a nut is used upon the shank, as shown in Fig. 4, and when a nut is not used the aperture $a^3$ is threaded, as shown in Fig. 3. The screw-threaded shank projects from the thinner portion of the wedge, and in use when the brace-bar $a$ is turned the wedge will be moved over the head of the bolt $b$, and thus draw together the parts which are engaged by the bolt and wedge. When the brace-bar and wedge are integral, the wedge will be forced inward to draw the parts together, and such parts may be further connected and held by screws, which are passed through the apertures near the ends of the brace-bar and into the connected parts.

The tap or screw-bolt $b$ engages one part, B, of the article of furniture, so that the head will be located at a suitable distance from the end of such part, and the other part, C, has a recess sufficient in size to admit the wedge beneath the head of the bolt, said part also having an opening $c$, through which the head of the tap or screw-bolt may be passed to be engaged by the wedge.

In assembling parts of furniture which are to be connected by the coupling one of the parts, as the pillars of a bureau, having projecting tap-screws or bolts $b$, are placed upon the other part—say the top of a bureau—so that the heads of the screws will pass through the openings $c$ and enter the recesses. The wedges may be then passed into the recesses, raised so that the shanks of the bolts will intersect the slots, the inclined faces of the wedges engaging the heads of the bolts, such heads having been first passed through the enlarged openings at the ends of the slots. The wedge is then moved to draw the parts together, the oblique faces of the wedges engaging the heads of the taps or screw-bolts and the straight faces will bear against the under sides of the recesses. The recess may be made by a suitable boring-tool which will cut when forming the recess the opening $c$, the recess intersecting one edge to provide an opening through which the wedge is passed. The bolt may be adjusted to suit the thickness of the part above the recess and the wedge, and said bolt can be adjusted to take up any shrinkage that may occur.

The coupling and brace may be used to connect such parts of furniture as have a rightangled joint, and the improvement may be modified otherwise than shown in the accompanying drawings.

Having thus described our invention, what we claim as new, and desire to secure by Letters Patent, is—

1. A coupling for joints of furniture, comprising a brace-bar, a wedge which engages the brace-bar and is maintained at substantially right angles thereto, such wedge having a slot therethrough, and openings through the end portions of the brace-bar, for the purpose set forth.

2. A coupling for joints of furniture consisting of a brace-bar, a slotted wedge connected to the brace-bar to project at right angles therewith, a bolt carried by one of the parts which it is desired to connect, an opening for the passage of the bolt and a recess in a part which is to be connected to the first-mentioned part, the wedge entering the recess to frictionally engage the part and the head of the bolt, the brace-bar overlying both of the connected parts, substantially as shown.

3. In a coupling and brace for furniture, a wedge which frictionally engages one part and a headed bolt attached to another part, a bar which overlies the connected parts and to which the wedge is attached, and means for holding the bar against the connected parts, substantially as shown.

4. As an article of manufacture, a furniture fastening or coupling consisting of a bar having apertures adjacent to its ends, a wedge having a keyhole-slot therethrough, such wedge being maintained at substantially right angles with the bar, for the purpose set forth.

5. As an improvement in fastening devices of the class described, the combination with the case furniture body member having an aperture, of a detachable part which rests upon the body member and over the aperture, said detachable part having an adjustable screw-bolt the headed end of which is passed through the aperture in the body member to position the head beyond the aperture through such part, a wedge which exerts a clamping action upon the head of the bolt and upon the part of the body member adjacent to the aperture, and a brace-bar which overlies the connected parts to hold them in engagement and to hold the wedge against displacement, the brace-bar being positively connected to the parts which are clamped by the bolt and wedge, substantially as shown.

6. As an improvement in fastening devices of the class described, the combination, with the furniture body member having an aperture therethrough, of a detachable vertical back piece the lower edge of which rests upon the body member, a screw-bolt which projects from the lower end of the detachable back piece so that its head will be beyond the aperture, a wedge which spans the stem of the bolt and engages the head and the body member adjacent to the aperture through said body member, and a brace-bar which is connected to the wedge and is also connected to the parts which are clamped to each other by the bolt and wedge, substantially as shown.

In testimony whereof we have hereunto set our hands in presence of two subscribing witnesses.

JACOB BRUNNER.
HIRAM J. ROOT.

Witnesses:
G. W. F. KIRK,
W. B. KIRK.